United States Patent
Ghosh et al.

(10) Patent No.: US 9,747,797 B1
(45) Date of Patent: Aug. 29, 2017

(54) METHOD AND SYSTEM FOR PREDICTING AVAILABILITY OF PARKING SPOT IN PARKING AREA

(71) Applicant: XEROX CORPORATION, Norwalk, CT (US)

(72) Inventors: Rahul Ghosh, Bangalore (IN); Anirban Mondal, Bangalore (IN)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 15/080,660

(22) Filed: Mar. 25, 2016

(51) Int. Cl.
*B60Q 1/48* (2006.01)
*G08G 1/14* (2006.01)
*G06Q 50/30* (2012.01)

(52) U.S. Cl.
CPC .............. *G08G 1/144* (2013.01); *G06Q 50/30* (2013.01)

(58) Field of Classification Search
CPC .......... G08G 1/14–1/149; G08G 1/168; G01C 21/3685; G06Q 50/30
USPC ........................... 340/932.2; 705/13; 701/400
See application file for complete search history.

(56) References Cited

U.S. PATENT DOCUMENTS

| | | | |
|---|---|---|---|
| 5,432,508 A * | 7/1995 | Jackson | E04H 6/42 340/932.2 |
| 6,426,708 B1 * | 7/2002 | Trajkovic | G08G 1/14 340/932.2 |
| 8,484,151 B1 | 7/2013 | Lookingbill | |
| 2005/0096974 A1 * | 5/2005 | Chagoly | G08G 1/14 705/13 |
| 2008/0048885 A1 | 2/2008 | Quinn | |
| 2012/0056758 A1 * | 3/2012 | Kuhlman | G08G 1/14 340/932.2 |
| 2013/0132102 A1 | 5/2013 | Andrade et al. | |
| 2013/0176147 A1 * | 7/2013 | Anderson | G08G 1/143 340/932.2 |
| 2015/0045985 A1 * | 2/2015 | Yenamandra | G01C 21/3679 701/1 |
| 2016/0358473 A1 * | 12/2016 | Scofield | G08G 1/14 |

FOREIGN PATENT DOCUMENTS

| | | |
|---|---|---|
| CN | 102024343 A | 4/2011 |
| WO | WO 2008132520 A1 | 11/2008 |
| WO | WO 2014100584 A1 | 6/2014 |
| WO | WO 2015033256 A1 | 3/2015 |

* cited by examiner

*Primary Examiner* — Thomas Mullen
(74) *Attorney, Agent, or Firm* — Jones Robb PLLC

(57) ABSTRACT

The disclosed embodiments illustrate methods and systems for predicting an availability of a parking spot in a parking area. The method includes generating a first signature for each of one or more first users. The first signature is generated based on at least a first set of data received from at least one or more first sensors in a first user-computing device associated with each of the one or more first users. The method further includes generating a second signature for each of the one or more first vehicles, based on at least a second set of data received from one or more second sensors in a first vehicle-computing device associated with each of the one or more first vehicles. Further, the method includes determining a likelihood of the availability of the one or more parking spots based on at least the first signature and the second signature.

17 Claims, 6 Drawing Sheets

METHOD AND SYSTEM FOR PREDICTING AVAILABILITY OF PARKING SPOT IN PARKING AREA

TECHNICAL FIELD

The presently disclosed embodiments are related, in general, to a parking system. More particularly, the presently disclosed embodiments are related to methods and systems for predicting an availability of a parking spot in a parking area.

BACKGROUND

With increasing advancement in transportation system, demand for one or more vehicles have significantly increased. Further, one or more individuals, who possess the one or more vehicles, prefer to use the one or more vehicles while travelling from one location to another location. For example, an employee may prefer to drive his/her car to his/her workplace. Further, the one or more individuals may require one or more parking spots in a parking area to park the one or more vehicles.

Generally, there are two types of parking area. For example, a first parking area corresponds to one that does not have a dashboard to display one or more available parking spots, and a second parking area corresponds to one that has dashboard. The one or more individuals, who may enter the first parking area, may have to rely on their manual observations to find the one or more available parking slots in the first parking area. Further, the one or more individuals, who may enter the second parking area, may further have to rely on their manual observations to find the one or more available parking slots, even if the dashboard may have displayed that the one or more parking slots are available in the second parking area. Such manual observations may consume time of the one or more individuals as well as unnecessary fuel of the one or more vehicles. Thus, a simplified, efficient, and automated technique may be desirable to overcome such problems faced by the one or more individuals.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method for predicting an availability of a parking spot in a parking area. The method includes generating, by one or more processors, a first signature for each of one or more first users associated with one or more first vehicles, parked at one or more parking spots in the parking area, based on at least a first set of data received from at least one or more first sensors in a first user-computing device associated with each of the one or more first users. The method further includes generating, by the one or more processors, a second signature for each of the one or more first vehicles, based on at least a second set of data received from one or more second sensors in a first vehicle-computing device associated with each of the one or more first vehicles. The method further includes determining, by the one or more processors, a likelihood of the availability of the one or more parking spots based on at least the first signature and the second signature. The method further includes presenting, by the one or more processors, a user interface on a display screen associated with a second vehicle displaying the one or more available parking spots to a second user based on at least the determined likelihood, wherein the second user requires the parking spot in the parking area to park the second vehicle.

According to embodiments illustrated herein, there is provided a system for predicting an availability of a parking spot in a parking area. The system includes one or more processors configured to generate a first signature for each of one or more first users associated with one or more first vehicles, parked at one or more parking spots in the parking area, based on at least a first set of data received from at least one or more first sensors in a first user-computing device associated with each of the one or more first users. The one or more processors are further configured to generate a second signature for each of the one or more first vehicles, based on at least a second set of data received from one or more second sensors in a first vehicle-computing device associated with each of the one or more first vehicles. The one or more processors are further configured to determine a likelihood of the availability of the one or more parking spots based on at least the first signature and the second signature. The one or more processors are further configured to present a user interface on a display screen associated with a second vehicle displaying the one or more available parking spots to a second user based on at least the determined likelihood, wherein the second user requires the parking spot in the parking area to park the second vehicle.

According to embodiments illustrated herein, there is provided a server for predicting an availability of a parking spot in a parking area. The server includes one or more processors configured to receive a real-time data associated with each of: one or more first users from one or more first sensors in one or more first user-computing devices, and one or more first vehicles from one or more second sensors in the one or more first vehicles, wherein the one or more first users are associated with one or more first vehicles. The one or more processors are further configured to receive the real-time data associated with each of the one or more first users and the one or more first vehicles from one or more third sensors that are installed at one or more locations in a premise and the parking area. The one or more processors are further configured to process the real-time data associated with each of one or more first users and one or more first vehicles. The one or more processors are further configured to determine a likelihood of the availability of the one or more parking spots based on at least the processed real-time data. The one or more processors are further configured to recommend the one or more available parking spots to a second user of a second vehicle based on at least the determined likelihood. Prior to determining the likelihood of the available parking spot, the one or more processors are configured to receive a request from the second user of the second vehicle, wherein the request is indicative of at least a requirement of the available parking spot in the parking area.

According to embodiments illustrated herein, there is provided a computer program product for use with a computing device. The computer program product comprises a non-transitory computer readable medium storing a computer program code for predicting an availability of a parking spot in a parking area. The computer program code is executable by one or more processors in the computing device to generate a first signature for each of one or more first users associated with one or more first vehicles, parked at one or more parking spots in the parking area, based on at least a first set of data received from at least one or more first sensors in a first user-computing device associated with each of the one or more first users. The computer program code is further executable by the one or more processors to generate a second signature for each of the one or more first vehicles, based on at least a second set of data received from one or more second sensors in a first vehicle-computing device associated with each of the one or more first vehicles. The computer program code is further executable by the one or more processors to determine a likelihood of the availability of the one or more parking spots based on at least the first signature and the second signature. The computer program code is further executable by the one or more processors to present a user interface on a display screen associated with a second vehicle displaying the one or more available parking spots to a second user based on at least the determined likelihood, wherein the second user requires the parking spot in the parking area to park the second vehicle.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
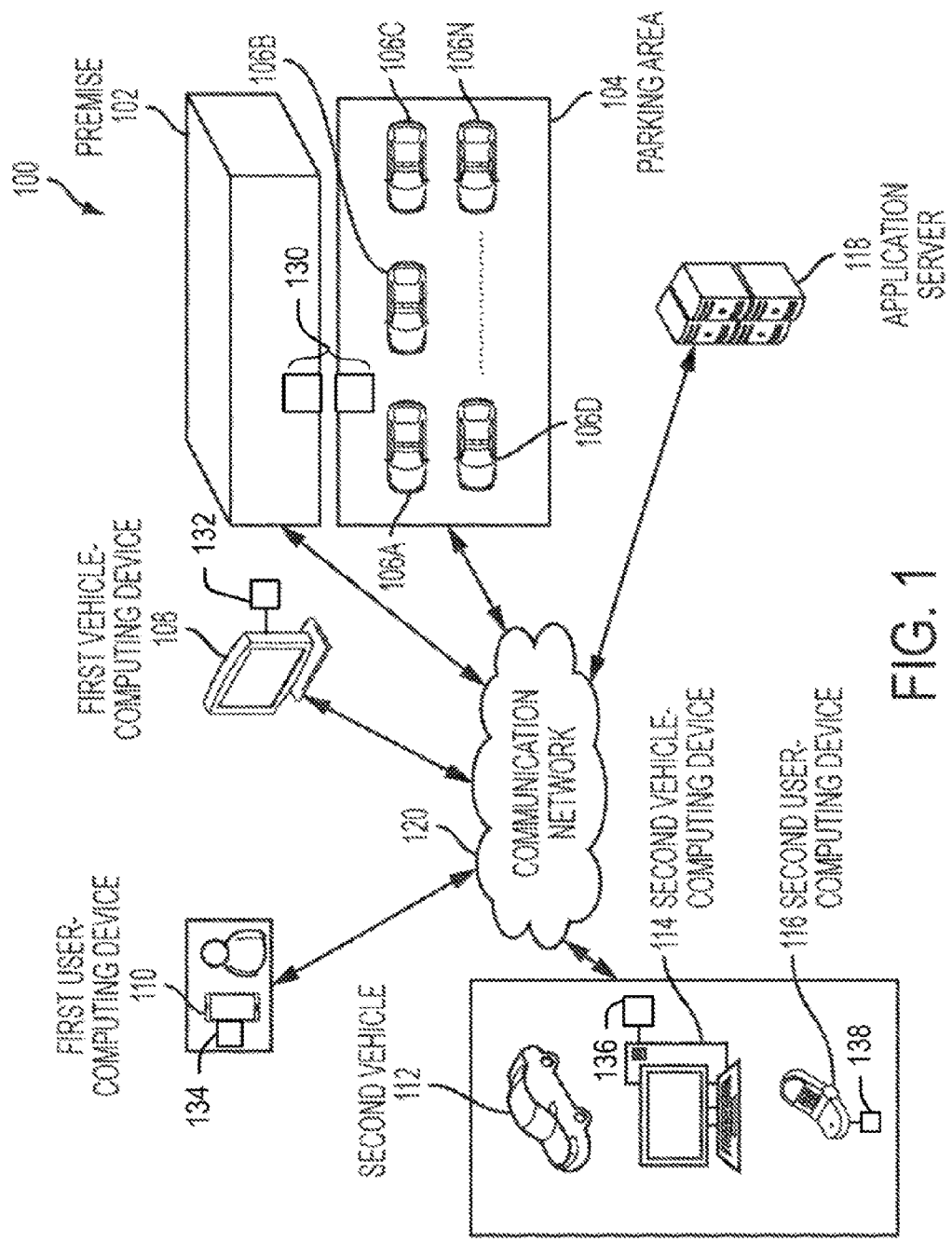
FIG. 1 is a block diagram of a system environment, in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions

The following terms shall have, for the purposes of this application, the meanings set forth below.

A "computing device" refers to a device that includes one or more processors/microcontrollers and/or any other electronic components, a device, or a system that performs one or more operations according to one or more programming instructions/codes. Examples of the computing device may include, but are not limited to, a desktop computer, a laptop, a personal digital assistant (PDA), a mobile device, a Smartphone, a tablet computer (e.g., iPad® and Samsung Galaxy Tab®), and/or the like.

"Parking" refers to an act of driving a vehicle to a location where a user of the vehicle can stop and leave the vehicle. Further, the vehicle may remain at the location for a time period. The duration of the time period may depend upon at least one or more activities of the user while the user is away from the vehicle.

A "parking area" refers to an area where one or more vehicles may be parked at one or more parking spots/locations. The parking area may include one or more parking lanes. Each of the one or more parking lanes may include the one or more parking spots, where the one or more vehicles may be parked. The parking area may correspond to an indoor/outdoor parking area. The indoor/outdoor parking area may be associated with one or more premises. The one or more premises may include one or more of: a house, sides of a road, multi-level structures, underground parking facilities, a business area, a shopping mall building, a grocery store building, airport, and/or the like.

A "vehicle" refers to a means of transportation that may transport one or more individuals and/or cargos between two or more locations. In one embodiment, at least one of the one or more individuals may be driving the vehicle. In another embodiment, the vehicle may correspond to an autonomous vehicle that may be capable of transporting the one or more individuals and/or the cargos between the two or more locations without being driven by the one or more individuals. In an embodiment, the vehicle may include at least one computing device that may be utilized to transmit/receive information pertaining to one or more queries (e.g., availability of a parking spot in a parking area) by the one or more individuals. Further, the vehicle may include one or more sensors (e.g., speed sensor, GPS sensor, and other vehicle sensors known in the art). In an embodiment, the vehicle may correspond to at least one of, but not limited to, a bus, a truck, a car, a ship, an airplane, and the like.

A "user of a vehicle" refers to an individual who is driving the vehicle from one location to another location. In an embodiment, the user of the vehicle may park the vehicle at an available parking spot in a parking area. In an embodiment, the parking area may be selected based on one or more of, but are not limited to, one or more needs of the user, one or more needs of one or more other users who are sitting in the vehicle, a cost of parking the vehicle in the parking area, a time duration for which the vehicle may be parked in the parking area, and one or more available parking spots in the parking area.

A "first vehicle" refers to a vehicle that is parked at a parking spot in a parking area. The first vehicle may be associated with a first user who may have driven the first vehicle to the parking spot. In an embodiment, the first vehicle may further include one or more other first users who were sitting in the first vehicle when the first vehicle may have reached the parking spot.

A "second vehicle" refers to a vehicle associated with at least one second user, who may be driving the second vehicle and may further require a parking spot in a parking area of a premise to park the second vehicle. The at least one second user may utilize a computing device in the second vehicle to transmit a request pertaining to an availability of the parking spot in the parking area.

A "first set of data of a first user" refers to a set of one or more first data that may be indicative of at least a behavior or intention (e.g., a change in position) of the first user in a parking area and/or a premise associated with the parking area. For example, the first set of data of a first user includes: a movement of the first user in the premise associated with the parking area, a number of steps taken by the first user to reach the parking area, a number of turns made by the first user, a time-stamp of one or more entries or exits of the first user from the parking area, and/or the like.

A "second set of data" refers to a set of one or more second data that may be indicative of a measure of one or more parameters of a first vehicle. For example, the second set of data of the first vehicle includes: a size of the first vehicle, a weight of the first vehicle, a duration of stay of the first vehicle in the parking area, and a location of a parking spot where the first vehicle is parked in the parking area.

A "first signature" refers to a data structure comprising a first set of data associated with a user (e.g., a first user) of a vehicle (e.g., a first vehicle).

A "second signature" refers to a data structure comprising a second set of data corresponding a vehicle (e.g., a first vehicle) parked at a parking spot in a parking area of a premise.

"One or more activities" refer to one or more actions of a user (e.g., a first user) that is indicative of a transition of the user from one phase (e.g., park car in a parking area) to another phase (e.g., enter a premise).

"Real-time" refers to a current time instant at which one or more parking spots may be available in a parking area.

"Near future-time" refers to a time instant with a delay with respect to a current time instant at which one or more parking spots may be available in a parking area.

"Real-time data" refer to a set of data that are associated with a current time instant. For example, the real-time data may include current activities of one or more users who are moving around a premise and/or a parking area associated with the premise. The real-time data may further include current activities of one or more vehicles associated with the one or more users. For example, a start of a vehicle, a movement of the vehicle, and/or the like.

FIG. 1 is a block diagram of a system environment 100 in which various embodiments may be implemented. The system environment 100 includes a premise 102, and one or more parking areas, such as a parking area 104 associated with the premise 102. The parking area 104 further includes one or more first vehicles (denoted by 106A, 106B, 106C, . . . , 106N) that may have been parked at one or more parking spots in the parking area 104. Further, in an embodiment, each of the one or more first vehicles (denoted by 106A, 106B, 106C, . . . , 106N) may include one or more first vehicle-computing devices, such as a first vehicle-computing device 108. In an embodiment, each of the one or more first vehicles (denoted by 106A, 106B, 106C, . . . , 106N) may be associated with one or more first users. Further, the one or more first users of each of the one or more first vehicles may possess or include one or more first user-computing devices, such as a first user-computing device 110. The system environment 100 further includes one or more second vehicles, such as a second vehicle 112 comprising a second vehicle-computing device 114. The second vehicle 112 may be associated with one or more second users. Further, the one or more second users of the second vehicle 112 may possess or include one or more second user-computing devices, such as a second user-computing device 116. The system environment 100 further includes one or more application servers, such as an application server 118 that may be communicatively coupled with one or more communication networks, such as a communication network 120. Various devices in the system environment 100 may be interconnected over the communication network 120.

The premise 102 refers to a business area (indoor or outdoor) where the one or more first users may travel to perform one or more actions. For example, an individual may travel to a shopping mall, market, or a grocery store to sell or purchase one or more products/services. An employee may travel to his/her workplace to perform his/her professional work. An individual may travel to a city airport to: board an airplane, receive one or more other individuals, and/or the like. A person having ordinary skills in the art will understand that the premise 102 is not limited to the business areas as mentioned in the above examples. The premise 102 may include a house, sides of a road, a multi-level building, and/or the like known in the art. In an embodiment, the premise 102 may include the one or more parking areas, such as the parking area 104. The parking area 104 may include one or more parking lanes. Each of the one or more parking lanes may include the one or more parking spots, where the one or more first users may have parked the one or more first vehicles (denoted by 106A, 106B, 106C, . . . , 106N).

The one or more first vehicles (denoted by 106A, 106B, 106C, . . . , 106N) may correspond to one or more vehicles that may have been utilized by the one or more first users to reach the premise 102. After reaching the premise 102, the one or more first users may have accessed the parking area 104, associated with the premise 102, to park the one or more first vehicles (denoted by 106A, 106B, 106C, . . . , 106N). In an embodiment, the one or more first users may be associated with the one or more first vehicles by offloading (e.g., by use of Bluetooth®) a unique IMEI number of one or more first user-computing device, such as the first user-computing device 110 to one or more third sensors 130 installed at the one or more parking spots in the parking area 104. This number can later be tracked to detect whether the one or more first users are moving forward the corresponding one or more parking spots. Further, in an embodiment, the one or more first vehicles (denoted by 106A, 106B, 106C, . . . , 106N) may include the one or more first vehicle-computing devices, such as the first vehicle-computing device 108.

The first vehicle-computing device 108 refers to a computing device that may be embedded in the first vehicle of the first user. The first vehicle-computing device 108 may comprise one or more processors and one or more memories. The one or more memories may include computer readable codes and instructions that may be executable by the one or more processors to perform one or more predetermined operations. For example, the one or more predetermined operations may include one or more of, but are not limited to, transmitting a request, pertaining to an availability of a parking spot in the parking area 104, to the application server 118, transmitting data detected by one or more second sensors 132 to the application server 118, and receiving a response pertaining to the transmitted request. In an embodiment, the first vehicle-computing device 108 may be configured to perform the one or more predetermined operations over the communication network 120.

In an embodiment, the first vehicle-computing device 108 may include the one or more second sensors 132. The one or more second sensors 132 associated with a first vehicle may be configured to: determine a current location of the first vehicle, detect start and stop of the first vehicle, and/or the like. For example, the first vehicle computing device 108 may include a navigation device with inbuilt GPS sensors.

Further, in an embodiment, the first vehicle-computing device 108 may include a display screen that may be utilized by the first user to provide one or more inputs pertaining to the request. Further, the first user may view the availability of the one or more parking spots in the parking area 104 on the display screen of the first vehicle-computing device 108.

The first vehicle-computing device 108 may correspond to a variety of computing devices such as, but not limited to, a laptop, a PDA, a tablet computer, a Smartphone, a phablet, and/or the like.

The first user-computing device 110 refers to a mobile device of the first user associated with the first vehicle. The first user-computing device 110 may comprise one or more processors and one or more memories. The one or more memories may include computer readable codes and instructions that may be executable by the one or more processors to perform one or more predetermined operations. For example, the one or more predetermined operations may include one or more of, but are not limited to, transmitting the request to the application server 118 over the communication network 120, and receiving the response pertaining to the transmitted request from the application server 118 over the communication network 120.

Further, the first user may have installed an application (e.g., a mobile app) on the first user-computing device 110. The first user may utilize the application to transmit one or more inputs (e.g., a request for a parking spot) to the application server 118. Further, the application on the first user-computing device 110 may be configured to track the movement of the first user in the premise 102 and/or the parking area 104. In an embodiment, the first user-computing device 110 may be communicatively coupled with the first vehicle-computing device 108 over the communication network 120.

The first user-computing device 110 may further comprise one or more first sensors 134. The one or more first sensors 134 are configured to track a movement of the first user in the premise 102 and/or the parking area 104. For example, an accelerometer sensor may be utilized to measure a distance travelled by a first user. A compass sensor may be utilized to detect one or more turns that the first user may have made while roving in the premise 102 and the parking area 104.

The first user-computing device 110 may correspond to a variety of computing devices such as, but are not limited to, a laptop, a PDA, a tablet computer, a Smartphone, a phablet, and/or the like.

Though, the first vehicle-computing device 108, and the first user-computing device 110 are depicted as independent with respect to each other in FIG. 1, a person skilled in the art will appreciate that the functionality of the first vehicle-computing device 108 may be realized by use of the first user-computing device 110 without departing from the scope of the disclosure. For example, the first user-computing device 110 may include a pre-installed application. The first user of the first user-computing device 110 may utilize the pre-installed application to perform the one or more predetermined operations of the first vehicle-computing device 108.

The second vehicle 112 refers to a vehicle associated with a second user, who may require a parking spot in the parking area 104 to park the second vehicle 112. In an embodiment, the second user may have utilized the second vehicle 112 to travel to the premise 102 to perform the one or more actions. In an embodiment, the second vehicle 112 may comprise the second vehicle-computing device 114.

The second vehicle-computing device 114 refers to a computing device that may be embedded in the second vehicle 112 of the second user. The second vehicle-computing device 114 may comprise one or more processors and one or more memories. The one or more memories may include computer readable codes and instructions that may be executable by the one or more processors to perform one or more predetermined operations. For example, the one or more predetermined operations may include one or more of, but are not limited to, transmitting a request, pertaining to an availability of a parking spot in the parking area 104, to the application server 118, and receiving a response pertaining to the transmitted request. In an embodiment, the second vehicle-computing device 114 may be configured to perform the one or more predetermined operations over the communication network 120.

In an embodiment, the second vehicle-computing device 114 may include (or communicatively coupled to) the one or more second sensors 136 associated with the second vehicle-computing device 114. The second vehicle-computing device 114 may further include a display screen that may be utilized by the second user to provide one or more inputs pertaining to the request. The second user may view the availability of the one or more parking spots in the parking area 104 on the display screen of the second vehicle computing device 114.

The second vehicle-computing device 114 may correspond to a variety of computing devices such as, but not limited to, a laptop, a PDA, a tablet computer, a Smartphone, a phablet, and/or the like.

The second user-computing device 116 refers to a mobile device of the second user associated with the second vehicle 112. The second user-computing device 116 may comprise one or more processors and one or more memories. The one or more memories may include computer readable codes and instructions that may be executable by the one or more processors to perform one or more predetermined operations. For example, the one or more predetermined operations may include one or more of, but are not limited to, transmitting the request to the application server 118 over the communication network 120, and receiving the response pertaining to the transmitted request from the application server 118 over the communication network 120. In an embodiment, the second user-computing device 116 may be communicatively coupled with the second vehicle-computing device 114 over the communication network 120.

The second user-computing device 116 may further comprise the one or more first sensors 138. The one or more first sensors 138 are configured to track the movement of the second user in the premise 102 and/or the parking area 104. For example, an accelerometer sensor may be utilized to measure a distance travelled by a second user. A compass sensor may be utilized to detect one or more turns that the second user may have made while roving in the premise 102 and the parking area 104.

The second user-computing device 116 may correspond to a variety of computing devices such as, but are not limited to, a laptop, a PDA, a tablet computer, a Smartphone, a phablet, and/or the like.

Though, the second vehicle-computing device 114, and the second user-computing device 116 are depicted as independent with respect to each other in FIG. 1, a person skilled in the art will appreciate that the functionality of the second vehicle-computing device 114 may be realized by use of the second user-computing device 116 without departing from the scope of the disclosure. For example, the second user-computing device 116 may include a pre-installed application. The second user of the second user-computing device 116 may utilize the pre-installed application to perform the one or more predetermined operations of the second vehicle-computing device 114.

The application server 118 may refer to a computing device or a software framework that may provide a generalized approach to create the application-server implementation. In an embodiment, the functionalities of the application server 118 may be dedicated to the efficient execution of procedures such as, but not limited to, programs, routines, or scripts stored in one or more memories for supporting its applied applications.

In an embodiment, the application server 118 may receive the request, pertaining to the availability of the one or more parking spots in the parking area 104, from the second user. The second user may have utilized the second vehicle-computing device 114 (and/or the second user-computing device 116) to transmit the request. After receiving the request, the application server 118 may transmit one or more queries to the one or more memories (e.g., one or more database units) to check the availability of the one or more parking spots in the parking area 104. In case the one or more parking spots are available (e.g., in real-time), the application server 118 may present a user interface on the display screen of the second vehicle-computing device 114 (and/or the second user-computing device 116). The user interface may be configured to display the one or more parking spots that are available in the parking area 104. Such one or more parking spots may be available in real-time.

In another embodiment, the application server 118 may extract the information pertaining to each of the one or more parking spots in the parking area 104, at which the one or more first users may have parked the respective one or more first vehicles (denoted by 106A, 106B, 106C, . . . , 106N), from one or more memories. The information pertaining to a parking spot may include one or more of, but are not limited to, a location of the parking spot in the parking area 104, and a duration for which the parking spot may have been occupied. The application server 118 may further extract a first set of data corresponding to each of the one or more first users, and a second set of data corresponding to each of the one or more first vehicles from the one or more memories. For example, the first set of data of a first user includes one or more of: a movement of the first user in the premise 102, a number of steps taken by the first user to reach the parking area 104, a number of turns made by the first user, and a time-stamp of one or more entries or exits of the first user from the parking area 104. The second set of data includes at least a measure of one or more of: a size of each of the one or more first vehicles, a duration of stay of each of the one or more first vehicles in the parking area 104, and a location of the one or more parking spots where the one or more first vehicles are parked in the parking area 104. In an embodiment, the application server 118 may further determine one or more activities of the one or more first users.

Further, in an embodiment, the application server 118 may process the first set of data, the second set of data, and the one or more activities to determine a likelihood of the availability of the one or more parking spots in a near-future time. Thereafter, the application server 118 may present the user interface displaying the one or more parking spots, with corresponding likelihood, on the display screen of the second vehicle-computing device 114 (and/or the second user-computing device 116).

Prior to displaying the one or more parking spots available (real-time or near-future time) in the parking area 104, the application server 118 may be configured to utilize one or more predefined constraints so as to avoid a traffic congestion along the one or more parking lanes of the parking area 104. For example, four vehicles are waiting on a parking lane with an anticipation of a parking spot that may be available in a near-future time. This may generate an unnecessary traffic along the parking lane. In order to avoid such scenario, the application server 118 may allow a predefined number of vehicles to wait for the one or more parking spots that may be available along the parking lane in the near-future time. In another exemplary scenario, the one or more predefined constraints may consider a size of each of the one or more second vehicles, and a size of the one or more parking spots. For example, a size of vehicle needs to be smaller than a size of a parking spot.

The application server 118 may be realized through various types of application servers such as, but are not limited to, Java application server, .NET framework application server, and Base4 application server.

The communication network 120 corresponds to a medium through which content and messages flow between various devices of the system environment 100 (e.g., the first vehicle-computing device 108, the first user-computing device 110, the second vehicle-computing device 114, the second user-computing device 116, and the application server 118). Examples of the communication network 120 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the communication network 120 in accordance with various wired and wireless communication protocols such as Transmission Control Protocol and Internet Protocol (TCP/IP), User Datagram Protocol (UDP), and 2G, 3G, or 4G communication protocols.

Figure 2:
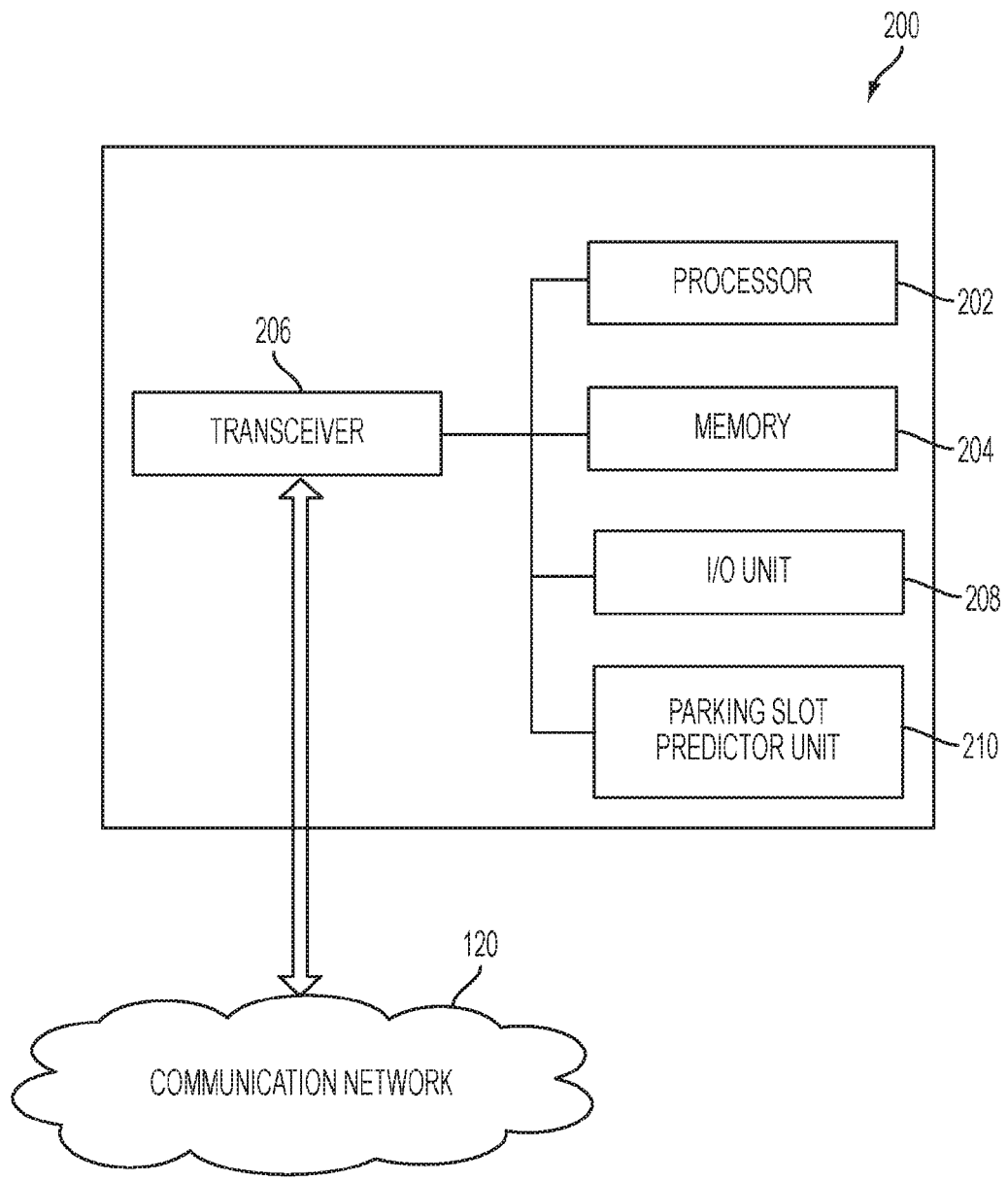
FIG. 2 is a block diagram that illustrates a system for predicting an availability of a parking spot in a parking area, in accordance with at least one embodiment.

FIG. 2 is a block diagram that illustrates a system 200 for predicting the availability of the one or more parking spots in the parking area 104, in accordance with at least one embodiment. In an embodiment, the system 200 may correspond to the first vehicle-computing device 108, the first user-computing device 110, the second vehicle-computing device 114, the second user-computing device 116, and the application server 118. For the purpose of ongoing description, the system 200 is considered as the application server 118. However, the scope of the disclosure should not be limited to the system 200 as the application server 118. The system 200 may also be realized as the first vehicle-computing device 108, the first user-computing device 110, the second vehicle-computing device 114, the second user-computing device 116, without departing from the spirit of the disclosure.

The system 200 includes one or more processors, such as a processor 202, one or more memories, such as a memory 204, one or more transceivers, such as a transceiver 206, one or more input/output units, such as an input/output (I/O) unit 208, and one or more parking slot predictor units, such as a parking slot predictor unit 210. The transceiver 206 is connected to the communication network 120.

The processor 202 may be configured to execute one or more sets of instructions, codes, scripts, and programs stored in the memory 204. The processor 202 is coupled to the memory 204, the transceiver 206, the I/O unit 208, and the parking slot predictor unit 210. The processor 202 may execute the one or more sets of instructions, codes, scripts, and programs stored in the memory 204 to perform the one or more associated operations. The processor 202 may be implemented based on a number of processor technologies known in the art. Examples of the processor 202 include, but are not limited to, an X86-based processor, a Reduced Instruction Set Computing (RISC) processor, an Application-Specific Integrated Circuit (ASIC) processor, and/or a Complex Instruction Set Computing (CISC) processor.

The memory 204 may be operable to store one or more machine codes, and/or computer programs having at least one code section executable by the processor 202. The memory 204 may store the one or more sets of instructions, codes, scripts, and programs. Some of the commonly known memory implementations include, but are not limited to, a random access memory (RAM), a read only memory (ROM), a hard disk drive (HDD), and a secure digital (SD) card. In an embodiment, the memory 204 may include the one or more machine codes, and/or computer programs that are executable by the processor 202 to perform specific operations. It will be apparent to a person having ordinary skill in the art that the one or more sets of instructions, codes, scripts, and programs stored in the memory 204 may enable the hardware of the system 200 to perform the one or more associated operations.

The transceiver 206 may be operable to communicate with the one or more devices, such as the first vehicle-computing device 108, the first user-computing device 110, the second vehicle-computing device 114, the second user-computing device 116 and/or one or more servers, such as the application server 118 over the communication network 120. The transceiver 206 may be configured to receive one or more requests from the one or more second users. Further, the transceiver 206 may be configured to store the one or more requests in the memory 204. The transceiver 206 may further transmit the one or more responses pertaining to the one or more requests to the one or more second vehicle-computing devices, such as the second vehicle-computing device 114. Examples of the transceiver 206 may include, but are not limited to, an antenna, an Ethernet port, a USB port, or any other port that can be configured to receive and transmit data. The transceiver 206 receives and transmits the one or more requests/responses/information/notification messages in accordance with the various communication protocols, such as, TCP/IP, UDP, and 2G, 3G, or 4G communication protocols through an input terminal and an output terminal, respectively over the communication network 120.

The I/O unit 208 may comprise suitable logic, circuitry, interfaces, and/or code that may be operable to receive one or more inputs from the one or more first users and the one or more second users. The I/O unit 208 may be operable to communicate with the processor 202. Examples of the input devices may include, but are not limited to, a touch screen, a keyboard, a mouse, a joystick, a microphone, a camera, a motion sensor, a light sensor, and/or a docking station.

The parking slot predictor unit 210 may comprise suitable logic, circuitry, interfaces, and/or code that may be operable to execute one or more sets of instructions, codes, scripts, and programs stored in the memory 204. The parking slot predictor unit 210 may be realized by use of one or more mathematical models, one or more statistical models and/or one or more algorithms, which may enable the prediction of the availability of the one or more parking slots in the parking area 104 based on the one or more inputs received from the one or more first users and the one or more second users. Though, the parking slot predictor unit 210 is depicted as independent from the processor 202 in FIG. 2, a person skilled in the art will appreciate that the parking slot predictor unit 210 may be implemented within the processor 202 without departing from the scope of the disclosure. Further, a person skilled in the art will appreciate that the processor 202 may be configured to perform the functionalities of the parking slot predictor unit 210 without departing from the scope of the disclosure. The parking slot predictor unit 210 may be implemented based on a number of processor technologies known in the art. Examples of the parking slot predictor unit 210 include, but are not limited to, an X86-based processor, a Reduced Instruction Set Computing (RISC) processor, an Application-Specific Integrated Circuit (ASIC) processor, and/or a Complex Instruction Set Computing (CISC) processor.

Figure 3:
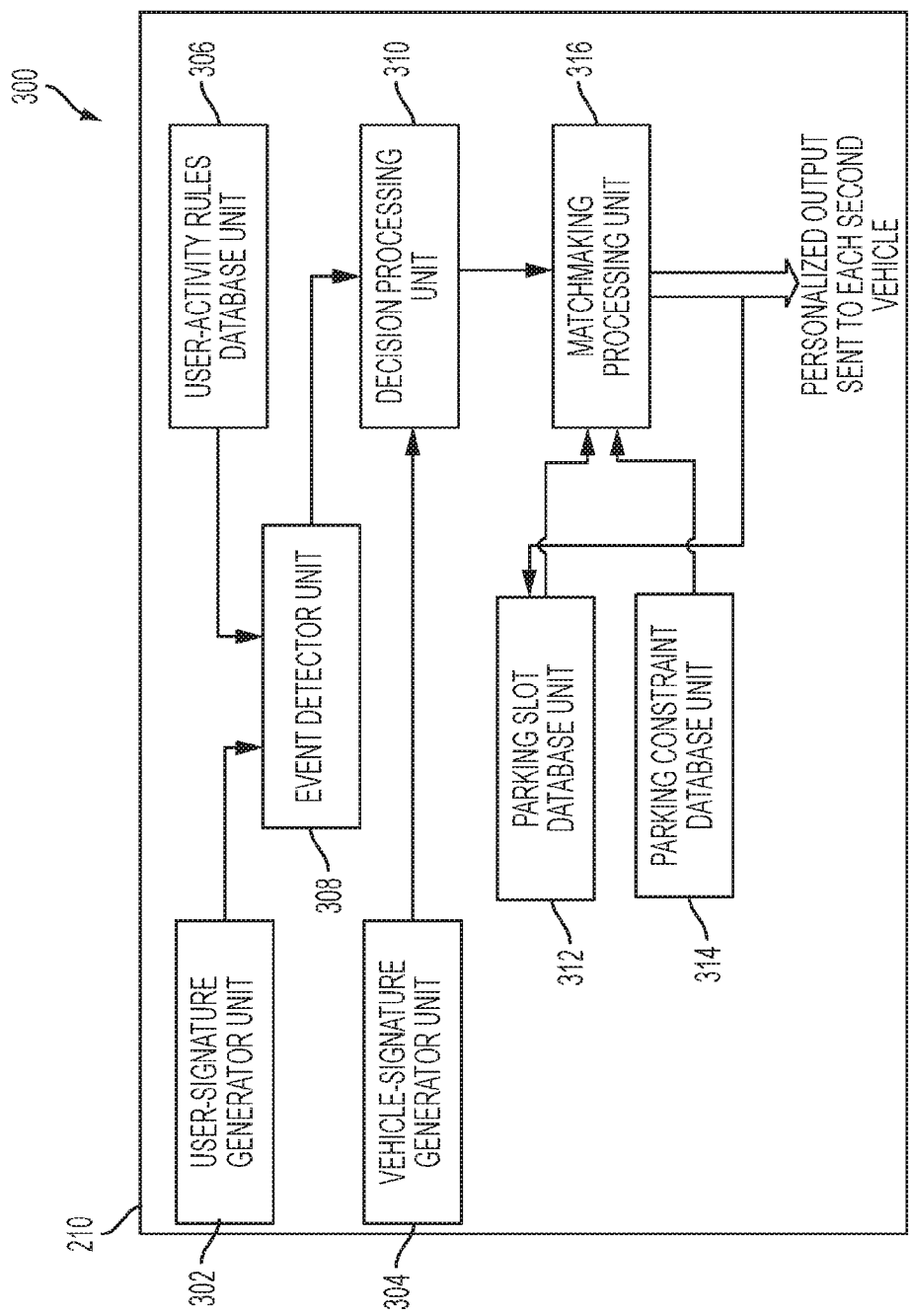
FIG. 3 is a block diagram of a parking slot prediction unit for predicting an availability of a parking spot in a parking area, in accordance with at least one embodiment.

A block diagram 300 of the parking slot predictor unit 210 for predicting the one or more parking slots in the parking area 104 has been explained further in conjunction with FIG. 3.

The parking slot predictor unit 210 includes a user-signature generator unit 302, a vehicle-signature generator unit 304, a user-activity rules database unit 306, an event detector unit 308, a decision processing unit 310, a parking slot database unit 312, a parking constraint database unit 314, and a matchmaking processing unit 316.

The user-signature generator unit 302 may comprise suitable logic, circuitry, interfaces, and/or code that may be operable to execute one or more sets of instructions, codes, scripts, and programs stored in one or more storage units, such as the memory 204. The user-signature generator unit 302 may execute the one or more sets of instructions, codes, scripts, and programs stored in the memory 204 to perform one or more associated operations. For example, the user-signature generator unit 302 may be configured to generate a data structure (i.e., a first signature) based on information (e.g., activity data) associated with a user who may have parked his/her vehicle in the parking area 104. The user-signature generator unit 302 may be realized by use of one or more processor technologies known in the art. Examples of the user-signature generator unit 302 include, but are not limited to, an X86-based processor, a Reduced Instruction Set Computing (RISC) processor, an Application-Specific Integrated Circuit (ASIC) processor, and/or a Complex Instruction Set Computing (CISC) processor.

The vehicle-signature generator unit 304 may comprise suitable logic, circuitry, interfaces, and/or code that may be operable to execute one or more sets of instructions, codes, scripts, and programs stored in one or more storage units, such as the memory 204. The vehicle-signature generator unit 304 may execute the one or more sets of instructions, codes, scripts, and programs stored in the memory 204 to perform one or more associated operations. For example, the vehicle-signature generator unit 304 may be configured to generate a data structure (i.e., a second signature) based on information (e.g., vehicle data) associated with a vehicle that may be parked in the parking area 104. The vehicle-signature generator unit 304 may be realized by use of one or more processor technologies known in the art. Examples of the vehicle-signature generator unit 304 include, but are not limited to, an X86-based processor, a Reduced Instruction Set Computing (RISC) processor, an Application-Specific Integrated Circuit (ASIC) processor, and/or a Complex Instruction Set Computing (CISC) processor.

The user-activity rules database unit 306 may refer to a storage unit that may be configured to store one or more rules. The one or more rules may further be utilized to determine the one or more activities of the one or more first users. The one or more activities may correspond to one or more actions that are indicative of a transition of the one or more first users from a first phase (e.g., exiting a shopping store of the premise 102) to a second phase (e.g., entering a theater in the premise 102). In an embodiment, the one or more rules may be formulated by use of historical data (e.g., first signature, activities, etc.) of the one or more first users who may have parked the corresponding first vehicles in the parking area 104 in the past. For example, a rule may define an activity of a user as "sitting" when one or more readings of an accelerometer sensor is static, while "90 degree" in a compass reading and an accelerometer reading may correspond to "a sharp turn followed by walking". Another rule may define the activity of the user as "entering the parking area 104" when the user is near the parking area 104. For example, assume the parking area 102 is underground, i.e., below a ground level of the premise 102. A user is on "level 10" of the premise 102. The user enter an elevator of the premise 102 and press an input button as "−1". In such a case, the rule may define the activity of the user as "going to the parking area 104". Similarly, the one or more rules may be formulated.

In an embodiment, the user-activity rules database unit 306 may receive a query from the processor 202 (or the event detector unit 308) to retrieve the one or more rules. For querying the user-activity rules database unit 306, one or more querying languages may be utilized such as, but not limited to, SQL, QUEL, DMX and so forth. Further, the user-activity rules database unit 306 may be realized through various technologies such as, but not limited to, Microsoft® SQL server, Oracle, and My SQL.

Though, the user-activity rules database unit 306 has been implemented with the parking slot predictor unit 210 as shown in FIG. 3, a person skilled in the art will appreciate that the user-activity rules database unit 306 may be depicted as independent from the parking slot predictor unit 210 without departing from the scope of the disclosure.

The event detector unit 308 may comprise suitable logic, circuitry, interfaces, and/or code that may be operable to execute one or more sets of instructions, codes, scripts, and programs stored in one or more storage units, such as the memory 204. The event detector unit 308 may execute the one or more sets of instructions, codes, scripts, and programs stored in the memory 204 to perform one or more associated operations. For example, the event detector unit 308 may utilize the first signature of a first user, and one or more rules stored in the user-activity rules database unit 306 to determine the one or more activities (i.e., one or more current activities) of the first user. Such one or more activities of the first user may represent the real-time actions of the first user in the premise 102 and/or the parking area 104. The event detector unit 308 may be realized by use of one or more processor technologies known in the art.

The decision processing unit 310 may comprise suitable logic, circuitry, interfaces, and/or code that may be operable to execute one or more sets of instructions, codes, scripts, and programs stored in one or more storage units, such as the memory 204. The decision processing unit 310 may execute the one or more sets of instructions, codes, scripts, and programs stored in the memory 204 to perform one or more associated operations. For example, the decision processing unit 310 may take one or more activities of a first user, and a second signature of a first vehicle of the first user as inputs to determine an intent of the first user. The output of the decision processing unit 310 is a probabilistic decision of whether the first user is about to leave the parking are 104 or is looking for a parking spot in the parking area 104.

The decision processing unit 310 may be realized by use of one or more processor technologies known in the art. Examples of decision processing unit 310 include, but are not limited to, an X86-based processor, a Reduced Instruction Set Computing (RISC) processor, an Application-Specific Integrated Circuit (ASIC) processor, and/or a Complex Instruction Set Computing (CISC) processor.

The parking slot database unit 312 may refer to a storage unit that may be configured to store metadata associated with each of the one or more parking spots in the parking area 104. For example, the metadata of a parking spot may include one or more of, but are not limited to, a location of the parking spot in the parking area 104, a size (i.e., length, width, and height) of the parking spot, information indicative of whether the parking spot is available or occupied, a duration for which the parking spot is occupied.

In an embodiment, the parking slot database unit 312 may receive a query from the processor 202 (or the matchmaking processing unit 316) to retrieve the metadata associated with each of the one or more parking spots. For querying the parking slot database unit 312, one or more querying languages may be utilized such as, but not limited to, SQL, QUEL, DMX and so forth. Further, the parking slot database unit 312 may be realized through various technologies such as, but not limited to, Microsoft® SQL server, Oracle, and My SQL.

Though, the parking slot database unit 312 has been implemented with the parking slot predictor unit 210 as shown in FIG. 3, a person skilled in the art will appreciate that the parking slot database unit 312 may be depicted as independent from the parking slot predictor unit 210 without departing from the scope of the disclosure.

The parking constraint database unit 314 may refer to a storage unit that may be configured to store the one or more predefined constraints. In an embodiment, the matchmaking processing unit 316 may utilize the one or more predefined constraints prior to assigning/displaying the availability of the one or more parking spots in the parking area 104. For example, a predefined constraint may be based on a size of a vehicle to be parked and a size of an available parking spot, i.e., the size of the vehicle needs to be smaller (or equal) to the size of the available parking spot. Another constraint may be based on an allocation of one or more second vehicles along a parking lane. For example, if too many second vehicles are waiting in the parking lane with an anticipation of parking spots in the near-future, then it may impact incoming traffic along the parking lane.

In an embodiment, the parking constraint database unit 314 may receive a query from the processor 202 (or the matchmaking processing unit 316) to retrieve the one or more predefined constraints. For querying the parking constraint database unit 314, one or more querying languages may be utilized such as, but not limited to, SQL, QUEL, DMX and so forth. Further, the parking constraint database unit 314 may be realized through various technologies such as, but not limited to, Microsoft® SQL server, Oracle, and My SQL.

Though the parking constraint database unit 314 has been implemented within the parking slot predictor unit 210 as shown in FIG. 3, a person skilled in the art will appreciate that the parking constraint database unit 314 may be depicted as independent from the parking slot predictor unit 210 without departing from the scope of the disclosure.

Though the user-activity rules database unit 306, the parking slot database unit 312, and the parking constraint database unit 314 are depicted as independent with respect to each other in FIG. 3, a person skilled in the art will appreciate that the user-activity rules database unit 306, the parking slot database unit 312, and the parking constraint database unit 314 may be collectively implemented as a single database unit within the parking slot predictor unit 210 without departing from the scope of the disclosure.

The matchmaking processing unit 316 may comprise suitable logic, circuitry, interfaces, and/or code that may be operable to execute one or more sets of instructions, codes, scripts, and programs stored in one or more storage units, such as the memory 204. The matchmaking processing unit 316 may execute the one or more sets of instructions, codes, scripts, and programs stored in the memory 204 to perform one or more associated operations. For example, the matchmaking processing unit 316 may determine the availability of the one or more parking spots in the parking area 104. Further, the matchmaking processing unit 316 may utilize the one or more predefined constraints to recommend the one or more available parking spots to one or more second users. In an embodiment, the processor 202 in conjunction with the matchmaking processing unit 316 transmit the personalized output (possible availability of one or more parking spots in a near future-time) to each of one or more second users.

In an embodiment, the one or more associated operations or functionalities of the matchmaking processing unit 316 may be realized by use of one or more algorithms known in the art. For example, a hashtag algorithm may utilized to map one or more second vehicles to one or more available parking spots. In case of a collision in hash function, the matchmaking processing unit 316 may utilize factors, such as, but are not limited to, a time of arrival of one or more second vehicles, proximity of the one or more second vehicles to a parking spot, presence of one or more first vehicles in a vicinity, and randomized allocation. In addition to the hashtag algorithms, the matchmaking processing unit 316 utilize a wide gamut of algorithms known in the art for solving the matchmaking problem, and any efficient matchmaking algorithm can be used with some practically feasible variations in conjunction with our proposed approach. The matchmaking processing unit 316 may be realized by use of one or more processor technologies known in the art. Examples of the matchmaking processing unit 316 include, but are not limited to, an X86-based processor, a Reduced Instruction Set Computing (RISC) processor, an Application-Specific Integrated Circuit (ASIC) processor, and/or a Complex Instruction Set Computing (CISC) processor.

Figure 4:
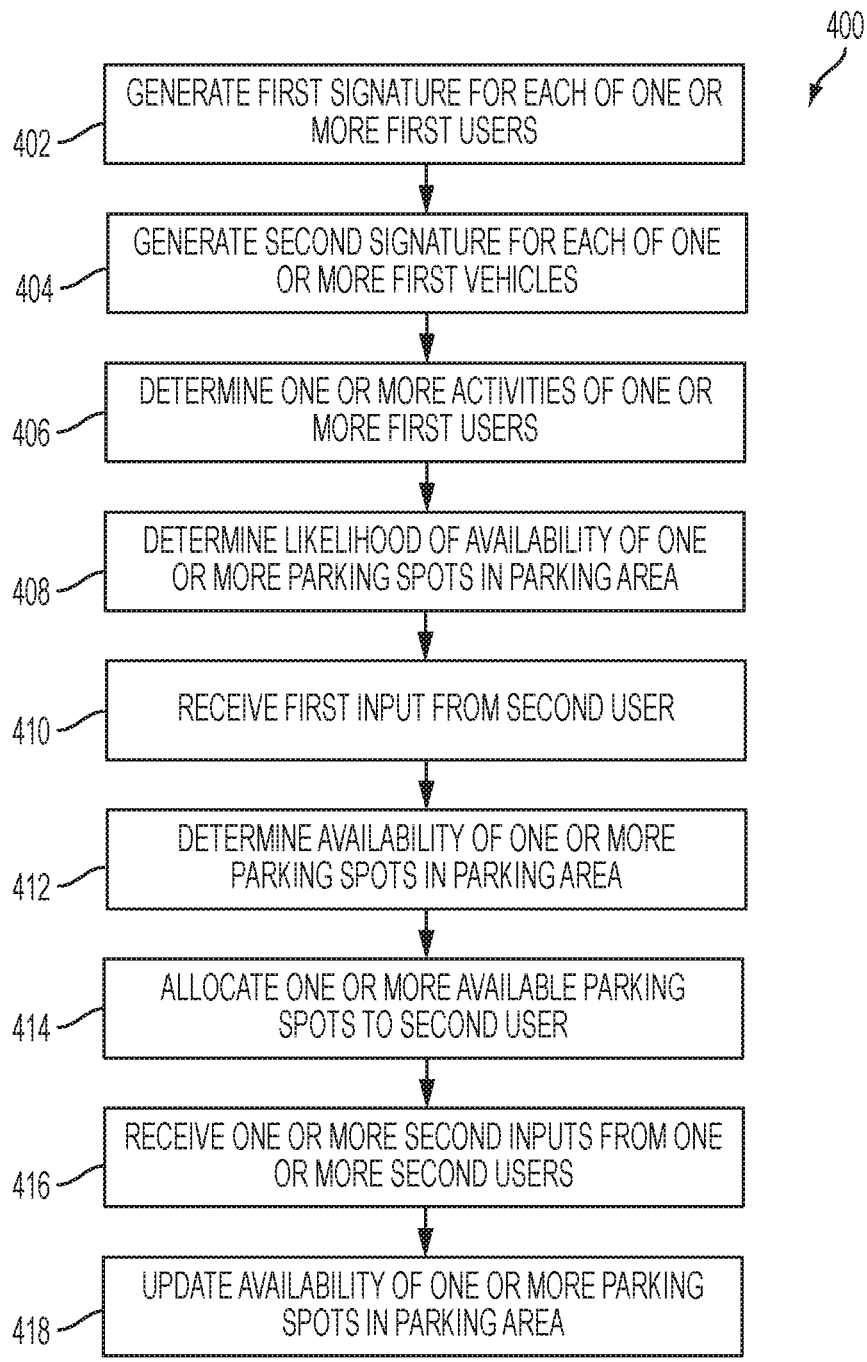
FIG. 4 is a flowchart that illustrates a method for predicting an availability of a parking spot in a parking area, in accordance with at least one embodiment.

FIG. 4 is a flowchart 400 that illustrates a method for predicting the availability of the one or more parking spots in the parking area 104, in accordance with at least one embodiment. The flowchart 400 has been described in conjunction with FIG. 1, FIG. 2, and FIG. 3.

At step 402, the first signature for each of the one or more first users is generated. In an embodiment, the user-signature generator unit 302 may be configured to generate the first signature for each of the one or more first users. In an embodiment, the one or more first users may correspond to one or more individuals who may have travelled to the premise 102 to perform one or more personal/professional works. Further, the one or more first users may have parked their corresponding one or more vehicles (i.e., the one or more first vehicles) at the one or more parking slots in the parking area 104 of the premise 102. In an embodiment, the first signature of a first user associated with the first vehicle may correspond to a data structure comprising one or more first data of the first user. The one or more first data may include the data (e.g., real-time data) that may be indicative of at least a behavior or an intent (e.g., change in position) of the first user in the premise 102 and/or the parking area 104. In an embodiment, the one or more first data of the first user may include one or more of, but are not limited to, a movement of the first user in the premise 104, a number of steps taken by the first user to reach the parking area 104, a number of turns made by the first user, and a time-stamp of one or more entries or exits of the first user from the parking area 104.

In an embodiment, the one or more first sensors in the first user-computing device 110 may be configured to measure each of the one or more first data of the first user. The one or more first sensors may include one or more of, but are not limited to, a Global Positioning System (GPS) sensor, an accelerometer sensor, a barometer sensor, a compass sensor, and a Wi-Fi sensor. The first user-computing device 110 may determine the location information and movement of the first user based on the measure of the one or more first sensors. For example, the accelerometer sensor may determine a change in coordinates associated with a location of the first user (or the first user-computing device 110). A compass sensor may determine the direction of the movement of the first user. For example, the first user-computing device 110 may determine, using the compass sensor, an angle θ between a magnetic north direction and a y-axis, around a z-axis. Based on the determined movement of the first user, the first user-computing device 110 may determine the number of steps taken the by the first user in the direction of the movement.

Further, in an embodiment, the processor 202 may receive the one or more first data from the one or more first sensors by use of one or more near-field communication (NFC) sensors. Thereafter, the processor 202 may store the received one or more first data in the memory 204. The first user-computing device 110 may extract the one or more first data of the first user from the memory 204. Further, the first user-computing device 110 may be configured to collate the one or more first data to generate the first set of data. Thereafter, the user-signature generator unit 302 may utilize the first set of data of the first user to generate the first signature of the first user. Similarly, the user-signature generator unit 302 may be configured to generate the first signature for each of the remaining one or more first users, who may have parked their corresponding one or more first vehicles in the parking area 104 of the premise 102.

At step 404, the second signature for each of the one or more first vehicles is generated. In an embodiment, the vehicle-signature generator unit 304 may be configured to generate the second signature for each of the one or more first vehicles. In an embodiment, the one or more first vehicles may correspond to one or more vehicles that may have been utilized by the one or more first users to reach the premise 102 to perform the one or more personal/professional works. Further, the one or more first vehicles may have been parked at the one or more parking slots in the parking area 104 of the premise 102. In an embodiment, the second signature of a first vehicle associated with a first user may correspond to a data structure comprising one or more second data of the first vehicle. The one or more second data may include the measure of one or more of, but are not limited to, a size of each of the one or more first vehicles, a duration of stay of each of the one or more first vehicles in the parking area 104, and a location of the one or more parking spots where the one or more first vehicles are parked in the parking area 104.

In an embodiment, the one or more second sensors in the first vehicle-computing device 108 may be configured to measure the one or more second data of the first vehicle. The one or more second sensors may include one or more of, but are not limited to, a Global Positioning System (GPS) sensor, an accelerometer sensor, a compass sensor, and an in-car sensor. The first vehicle-computing device 108 may determine the location information and movement of the first vehicle based on the measure of the one or more first sensors. Further, the first vehicle-computing device 108 may detect the start and stop of the first vehicle based on the one or more readings obtained from the one or more second sensors. Further, the in-car sensor in a first vehicle may transmit a signal that may be indicative of the one or more first users in the proximity of the first vehicle. For example, the in-car sensor may include one or more sensors that may detect a first user (carrying key if the first vehicle) who is in the proximity of the first vehicle.

Further, in an embodiment, the processor 202 may receive the one or more second data from the one or more second sensors and thereafter, may store the received one or more second data in the memory 204. The first vehicle-computing device 108 may extract the one or more second data of the first vehicle from the memory 204. Further, the first vehicle-computing device 108 may be configured to collate the one or more second data to generate the second set of data. Thereafter, the vehicle-signature generator unit 304 may utilize the second set of data of the first vehicle to generate the second signature of the first vehicle. Similarly, the vehicle-signature generator unit 304 may be configured to generate the second signature for each of the remaining one or more first vehicles, that are parked in the parking area 104 of the premise 102.

At step 406, the one or more activities of each of the one or more first users are determined. In an embodiment, the event detector unit 308 may be configured to determine the one or more activities of each of the one or more first users. The one or more activities may correspond to the one or more actions that are indicative of a transition of the one or more first users from a first phase (e.g., park car in the parking area 104) to a second phase (e.g., enter the premise 102).

In an embodiment, the event detector unit 308 may utilize the first signature, generated for the one or more first users, to determine the one or more activities of the one or more first users. The event detector unit 308 may further utilize data, measured/detected by the one or more third sensors, to determine the one or more activities of the one or more first users. For example, the one or more third sensors may include one or more image capturing sensors (e.g., camera). In an embodiment, the one or more third sensors may be installed at the one or more locations of the premise 102 and/or the parking area 104. The one or more third sensors may detect the one or more actions of the one or more first users from one location to another location. For example, the one or more third sensors installed at an entry terminal or an exit terminal of the parking area 104 may detect the entry or exit of the one or more first users from the parking area 104. Similarly, the one or more third sensors installed at one or more locations (e.g., shopping stores, theaters, elevators, and/or the like) in the premise 102 may be utilized to detect the location of the one or more first users in the premise 102.

In an embodiment, the event detector unit 308 may further be configured to implement the one or more rules on the first signature and the measured/detected data, obtained by use of the one or more third sensors, to determine the one or more activities of each of the one or more first users. Prior to the implementation, the event detector unit 308 may extract the one or more rules from the user-activity rules database unit 306.

In an embodiment, the one or more activities of the one or more first users may be received from the one or more first users over the communication network 120. The one or more first users may be motivated to share their one or more activities while they are in the premise 102 and/or the parking area 104. For example, the one or more first users may get one or more form of incentives if they share their one or more activities. The one or more form of incentives may include, but are not limited to, a compensation, a preference in the parking, and offers/discounts at one or more stores in the premise 102.

At step 408, the likelihood of the availability of the one or more parking spots in the parking area 104 is determined. In an embodiment, the decision processing unit 310 may be configured to determine the likelihood of the availability of the one or more parking spots in the parking area 104. The likelihood of the availability of the one or more parking spots may be determined based on the one or more activities of the one or more first users and the second signature determined for each of the one or more first vehicles. The likelihood may be determined in terms of a numerical value (e.g., a percentile value) that may be indicative of whether the one or more first users are about to leave the one or more parking spots. In order to determine the likelihood of the availability of the one or more parking spots in the parking area 104, the decision processing unit 310 may be configured to identify an intent or behavior of the one or more first users in the premise 102 and/or the parking area 104. The intent or behavior of the one or more first users may be determined by use of the one or more activities of the one or more first users (identified in step 406) and the second signature of the one or more first vehicles. For example, a first user came out of a cafeteria of the premise 102 (as detected by a third sensor installed in the premise 104). Thereafter, the first user enters an elevator of the premise 102 and presses an input button as "−2". In such a case, the likelihood of the first user to leave a parking slot occupied by a first vehicle (the first vehicle belong to the first user) in the parking area 104 may be high. In another example, a start of the one or more first vehicles in the parking area 104 may indicate that the one or more first users associated with the one or more first vehicles are about to leave the one or more parking slots in the parking area 104.

In another exemplary scenario, working hours of one or more employees at a work place may be utilized to determine the likelihood of the one or more employees leaving one or more parking spots occupied by one or more vehicles of the one or more employees. For example, the entry time of each of the one or more employees may be utilized to determine the likelihood of the one or more employees leaving one or more parking spots occupied by one or more vehicles of the one or more employees. Further, the working hours along with one or more activities (in or around the work place) of the one or more employees during or after the working hours may be utilized to determine the likelihood of the one or more employees leaving one or more parking spots occupied by one or more vehicles of the one or more employees. Further, the likelihood of the one or more employees leaving the one or more parking spots may be high when it is determined that the one or more employees are in an elevator and further, are heading towards the parking area 104.

Further, in an embodiment, the likelihood of the availability of the one or more parking spots in the parking area 104 may be updated after a pre-defined time interval. For example, the likelihood of the availability of the one or more parking spots in the parking area 104 may be updated with a time interval of "30 seconds", "1 minute", "2 minutes", "5 minutes", and/or the like. Such time interval may be provided by an administrator of the parking area 104. Further, in an embodiment, the one or more available parking spots (e.g., in real-time) and the likelihood of the availability of one or more parking spots (e.g., in near future-time) may be stored in the memory 204 or the parking slot database unit 312.

At step 410, a first input is received from the second user. The first input may be indicative of a requirement of a parking spot in the parking area 104 of the premise 102. In an embodiment, the processor 202 may be configured to receive the first input from the second user. The second user may have driven his/her second vehicle 112 to reach the premise 102. Further, the second user may wish to park his/her second vehicle 112 in the parking area 104. The second user may utilize the second vehicle-computing device 114 (or the second user-computing device 116) to provide the first input. The processor 202 may receive the first input through the transceiver 206 over the communication network 120.

Further, in an embodiment, the processor 202 may receive the data of the second vehicle 112 from the one or more third sensors installed at an entry gate of the parking area 104. For example, the data of the second vehicle 112 may correspond to at least a size of the second vehicle 112. The processor 202 may transmit the first input and data of the second vehicle 112 to the matchmaking processing unit 316.

At step 412, the availability of the one or more parking spots in the parking area 104 is determined. In an embodiment, the matchmaking processing unit 316 may be configured to determine the availability of the one or more parking spots in the parking area 104 based on the received input from the second user. The matchmaking processing unit 316 may transmit the one or more queries to the memory 204 or the parking slot database unit 312 to determine the availability (i.e., real-time and/or near future-time) of the one or more parking spots in the parking area 104.

At step 414, the one or more available parking spots are allocated to the second user. The one or more available parking spots correspond to the one or more parking spots that are available in the real-time and/or may be available in the near future-time. In an embodiment, the matchmaking processing unit 316 may be configured to allocate the one or more available parking spots to the second user.

Prior to allocating the one or more available parking spots to the second user, the matchmaking processing unit 316 may be configured to compare the metadata of the one or more available parking spots with that of the second vehicle 112. For example, the matchmaking processing unit 316 may compare a size of a parking spot with a size of the second vehicle 112. In case, the size of the second vehicle 112 is less than or equal to the size of the parking spot, the matchmaking processing unit 316 may allocate the parking spot to the second vehicle 112. In an embodiment, the matchmaking processing unit 316 may extract the metadata of the one or more parking spots from the parking slot database unit 312. Further, the matchmaking processing unit 316 may obtain the metadata of the second vehicle 112 from the one or more third sensors.

Further, in an embodiment, the matchmaking processing unit 316 may be configured to utilize an estimated time of the second vehicle 112 to reach the one or more available parking spots in the parking area 104 to allocate the one or more available parking spots to the second vehicle 112. For example, there is a multi-level parking structure having "10 levels". A user of a vehicle requested for a parking spot in the multi-level parking structure. The matchmaking processing unit 316 determines that a parking spot is available at "level 7" of the multi-level parking structure. The matchmaking processing unit 316 further determines that an average estimated time (determined based on historical time data) for the vehicle to reach "level 7" from "level 0" is "5 minutes." The matchmaking processing unit 316 further determines that a parking spot may be available at "level 2" (as determined by the decision processing unit 310) in "1 minute." Further, the average estimated time (determined based on historical time data) for the vehicle to reach "level 2" from "level 0" is "30 seconds." In such a case, the vehicle may get the parking spot at "level 2" in "1.5 minutes" as compared to the parking spot at "level 7" that will take at least "5 minutes." In such a scenario, the matchmaking processing unit 316 may recommend both the parking slots (one at "level 2" and other at "level 7") with the corresponding likelihood and/or the average estimated time to reach each of the parking spots.

Further, in an embodiment, the processor 202 in conjunction with the matchmaking processing unit 316 may present the user interface on the display screen of the second vehicle 112. The display screen may be associated with one or more of: the second vehicle-computing device 114, and the second user-computing device 116. For example, processor 202 in conjunction with the matchmaking processing unit 316 may transmit a pop-up message with notification of one or more available parking spots. In another exemplary scenario, the processor 202 in conjunction with the matchmaking processing unit 316 may present the user interface in the form of a hologram display in front of a windshield of the second vehicle 112.

Similarly, the processor 202 in conjunction with the matchmaking processing unit 316 may allocate and display the one or more available parking spots, when there is more than one requests for the one or more parking spots in the parking area 104. In case of the one or more requests transmitted by the one or more second vehicles, the matchmaking processing unit 316 may utilize one or more predefined constraints prior to allocating the one or more available parking spots to the one or more second vehicles. The matchmaking processing unit 316 may extract the one or more predefined constraints from the parking constraint database unit 314. The one or more predefined constraints may be based on at least the size of the one or more second vehicles, and the size of the one or more available parking spots. For example, a size of a second vehicle should be less than a size of a parking slot. The one or more predefined constraints may further be based on a count of the one or more second vehicles that may be allocated along the one or more parking lanes of the parking area 104 based on the one or more available parking spots in the one or more parking lanes. The matchmaking processing unit 316 may limit the count of the one or more second vehicles that may be allocated along the one or more parking lanes so that the traffic congestion along the one or more parking lanes may be avoided. For example, if four vehicles are waiting for an expected available parking spot along a parking lane, then it may create an unnecessary traffic congestion along the parking lane. In such a case, the matchmaking processing unit 316 may allocate the expected parking spot that may be available to at most two vehicles. Further, the one or more predefined constraints may further be based on a weight of the one or more second vehicles. For example, a parking structure includes one or more movable parking lanes. Each of the one or more movable parking lanes includes one or more parking slots. Further, each parking slot is associated with a predefined weight that the parking slot can withstand. In such a case, the weight of the second vehicle should be less than or equal to the predefined weight associated with the parking slot.

At step 416, one or more second inputs are received from the one or more second users. The one or more second inputs may be indicative of at least an acceptance or a rejection of the one or more available parking spots that may have been recommended to the one or more seconds users. In an embodiment, the processor 202 may receive the one or more second inputs from the second vehicle-computing device 114 (or the second user-computing device 116) in each of the one or more second vehicles, such as the second vehicle 112.

At step 418, the availability of the one or more parking spots in the parking area 104 is updated. In an embodiment, the matchmaking processing unit 316 may further be configured to update the availability of the one or more parking slots in the parking area 104 based on the received one or more second inputs. The updated availability of the one or more parking slots is stored in the parking slot database unit 312.

Figure 5:
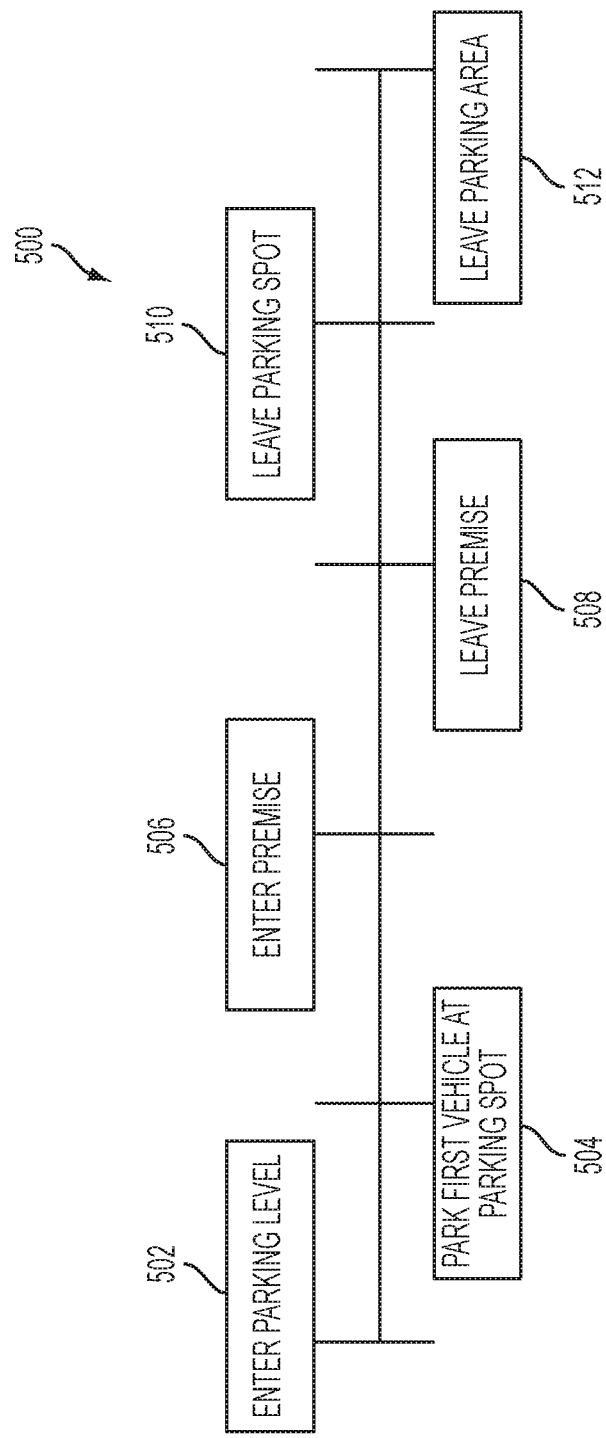
FIG. 5 is a block diagram that illustrates a life cycle of a user who has parked a vehicle in a parking area of a premise, in accordance with at least one embodiment.

FIG. 5 is a block diagram 500 that illustrates an exemplary scenario of a life cycle of a first user who may have parked a vehicle in the parking area 104 of the premise 102, in accordance with at least one embodiment.

In the illustrative block diagram 500 as shown in FIG. 5, the first user may enter a parking level (denoted by 502) of the parking area 104. The parking area 104 may be associated with one or more premises (e.g., a shopping mall, an airport, a railway station, a work place, and/or the like), such as the premise 102. Further, the first user may park his/her first vehicle at a parking spot (denoted by 504) in the parking area 104. Further, the first user may leave the parking area 104, and thereafter, may enter the premise 102 (denoted by 506). The first user may perform one or more activities in the premise 102. For example, the first user enters a shopping multiplex. The first user may roam around the shopping multiplex. Further, the first user may purchase one or more products/services from one or more shopping stores of the shopping multiplex. Further, the first user may enter a restaurant and/or a movie theater in the shopping multiplex. After the first user has performed the one or more activities in the premise 102, the first user may leave the premise 102 (denoted by 508) and further, may move towards the parking area 104. The first user may take an elevator to proceed towards the parking area 104. After entering the parking area 104, the first user may move towards the parking spot where he/she has parked the first vehicle. Further, the first user may leave the parking spot (denoted by 510) by driving the first vehicle from the parking spot. Further, the first user may leave the parking area 104 (denoted by 512). In an embodiment, the one or more activities of the first user in the premise 102 and/or the parking area 104 are tracked by use of one or more first sensors, one or more second sensors, and one or more third sensors. The one or more first sensors are installed in one or more computing devices (e.g., a smartphone) of the first user. The one or more second sensors are installed in the first vehicle of the first user. The one or more third sensors are installed in at one or more locations in the premise 102 and/or the parking area 104.

Figure 6:
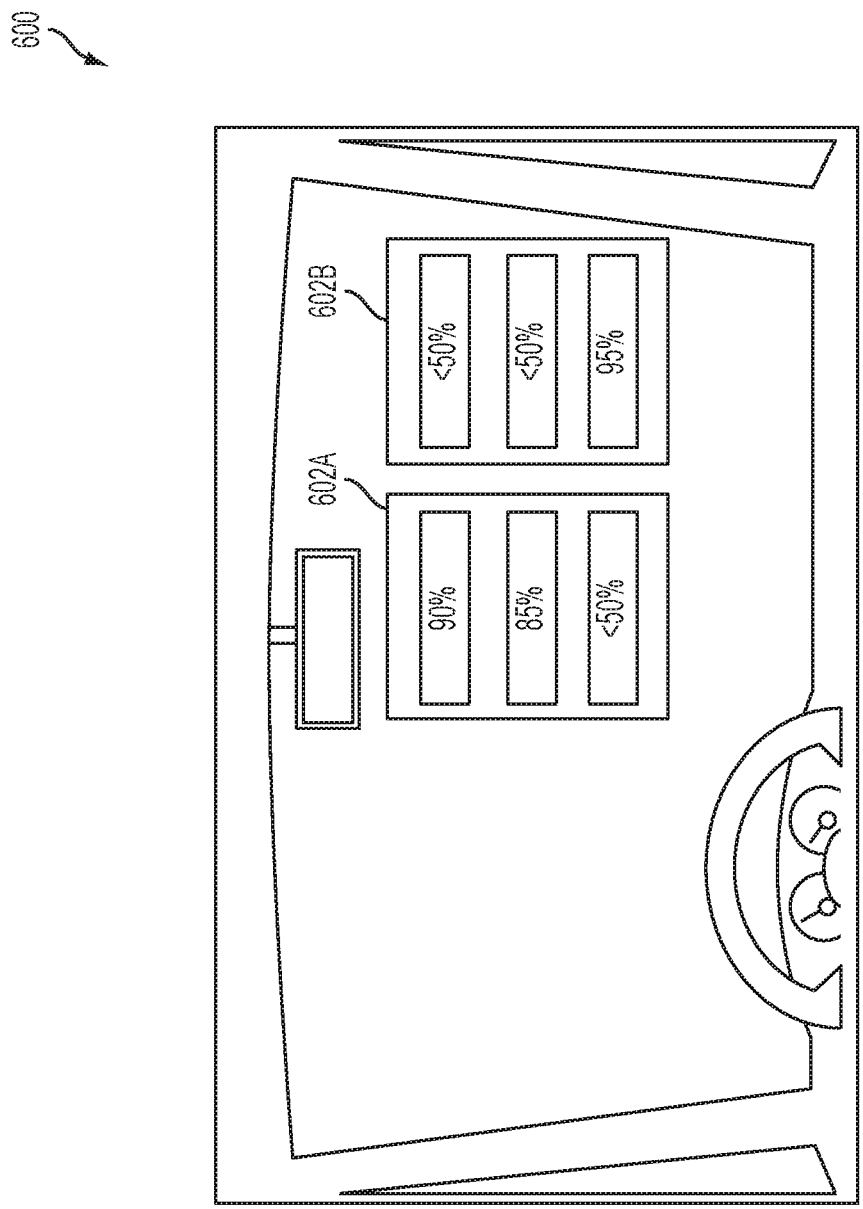
FIG. 6 is a block diagram that illustrates a user interface displaying availability of one or more parking spots in a parking area, in accordance with at least one embodiment.

FIG. 6 is a block diagram 600 that illustrates an exemplary scenario of a user interface displaying an availability of the one or more parking spots in the parking area 104, in accordance with at least one embodiment.

In an embodiment, the processor 202 may present the user interface as a hologram display in front of a windshield of one or more second vehicles, such as the second vehicle 112. The user interface may display the availability of the one or more parking spots in the parking area 104 with the corresponding likelihood. For example, the user interface, as shown in FIG. 6, displays an availability in a first parking lane 602A and a second parking lane 602B. Each of the first parking lane 602A and the second parking lane 602B has three parking spots which are pre-occupied. The user interface displays the likelihood of the availability of each of the three parking spots in each of the first parking lane 602A and the second parking lane 602B. For example, the first parking lane 602A includes a parking spot that has a likelihood (i.e., 90%) of availability in a near future-time. Similarly, the second parking lane 602B includes a parking spot that has a high likelihood (i.e., 95%) of availability in a near future-time.

The disclosed embodiments encompass numerous advantages. The disclosure provides a method for predicting one or more parking spots that may be available in a near future-time. Such availability is determined based on at least one or more activities of one or more first users who may have parked their corresponding one or more first vehicles at the one or more parking spots. The disclosed methods provides better utilization of the one or more parking slots. Further, the disclosed methods are highly efficient in predicting the one or more parking spots that may be available in the near future-time, thereby reducing cruising of one or more second users of one or more second vehicles, who may be looking for the one or more available parking spots. As a result, the disclosed methods may help the one or more second users to save time. Further, the disclosed methods may help the one or more second users in reducing unnecessary fuel consumptions of the one or more second vehicles. As a result, the disclosed methods may help the one or more second users to save money on a cost of the fuel.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for predicting an availability of one or more parking spots in a parking area have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for predicting an availability of a parking spot in a parking area, the method comprising:
  generating, by one or more processors, a first signature for each of one or more first users associated with one or more first vehicles, parked at one or more parking spots in the parking area, based on at least a first set of data received from at least one or more first sensors in a first user-computing device associated with each of the one or more first users;
  generating, by the one or more processors, a second signature for each of the one or more first vehicles, based on at least a second set of data received from one or more second sensors in a first vehicle-computing device associated with each of the one or more first vehicles;
  determining, by the one or more processors, a likelihood of the availability of the one or more parking spots based on at least the first signature and the second signature;
  receiving, by the one or more processors, a first input from a second user-computing device associated with a second user of a second vehicle, wherein the first input is indicative of a requirement of one of the one or more parking spots in the parking area;
  presenting, by the one or more processors, a user interface on a display screen of the second vehicle, the user interface displaying available parking spots of the one or more parking spots to the second user based on at least the determined likelihood; and
  recommending, by the one or more processors, one of the available parking spots based on a predefined constraint, wherein the predefined constraint is utilized to avoid traffic congestion along one or more parking lanes of the parking area, and wherein the predefined constraint comprises one or both of a size of the second vehicle or a number of vehicles waiting for said one of the available parking spots.

2. The method of claim 1, wherein the first set of data of a first user includes one or more of: a movement of the first user in a premise associated with the parking area, a number of steps taken by the first user to reach the parking area, a number of turns made by the first user while moving in one or both of the premise and the parking area, and a timestamp of one or more entries or exits of the first user to or from the parking area.

3. The method of claim 1, wherein the second set of data includes at least a measure of one or more of: a size of each of the one or more first vehicles, a duration of stay of each of the one or more first vehicles in the parking area, and a location of the one or more parking spots where the one or more first vehicles are parked in the parking area.

4. The method of claim 1 further comprising determining, by the one or more processors, an activity of each of the one or more first users in one of a premise and the parking area.

5. The method of claim 4, wherein the activity is determined by use of the first signature and one or more third sensors installed at one or more locations in the premise and the parking area.

6. The method of claim 5, wherein the likelihood of the availability of the one or more parking spots is determined based on the activity and the second signature.

7. The method of claim 1 further comprising receiving, by the one or more transceivers, a second input from the second user-computing device over the computer network, wherein the second input is indicative of at least an acceptance or a rejection of the recommendation for the parking spot from the available parking spots.

8. A system for predicting an availability of a parking spot in a parking area, the system comprising:
one or more processors configured to:
generate a first signature for each of one or more first users associated with one or more first vehicles, parked at one or more parking spots in the parking area, based on at least a first set of data received from at least one or more first sensors in a first user-computing device associated with each of the one or more first users;
generate a second signature for each of the one or more first vehicles, based on at least a second set of data received from one or more second sensors in a first vehicle-computing device associated with each of the one or more first vehicles;
determine a likelihood of the availability of the one or more parking spots based on at least the first signature and the second signature;
receive a first input from a second user-computing device associated with a second user of a second vehicle, wherein the first input is indicative of a requirement of one of the one or more parking spots in the parking area;
present a user interface on a display screen of the second vehicle, the display screen displaying available parking spots of the one or more parking spots to the second user based on at least the determined likelihood; and
recommend one of the available parking spots based on a predefined constraint, wherein the predefined constraint is utilized to avoid traffic congestion along one or more parking lanes of the parking area, and wherein the predefined constraint comprises one or both of a size of the second vehicle or a number of vehicles waiting for said one of the available parking spots.

9. The system of claim 8, wherein the first set of data of a first user includes one or more of: a movement of the first user in a premise associated with the parking area, a number of steps taken by the first user to reach the parking area, a number of turns made by the first user while moving in one or both of the premise and the parking area, and a timestamp of one or more entries or exits of the first user to or from the parking area.

10. The system of claim 8, wherein the second set of data includes at least a measure of one or more of: a size of each of the one or more first vehicles, a duration of stay of each of the one or more first vehicles in the parking area, and a location of the one or more parking spots where the one or more first vehicles are parked in the parking area.

11. The system of claim 8, wherein the one or more processors are further configured to determine an activity of each of the one or more first users in a premise and the parking area, wherein the activity is determined by use of the first signature and one or more third sensors installed at one or more locations in the premise and the parking area.

12. The system of claim 11, wherein the likelihood of the availability of the one or more parking spots is determined based on the activity and the second signature.

13. The system of claim 8 wherein the one or more transceivers are further configured to receive a second input from the second user-computing device over the computer network, wherein the second input is indicative of at least an acceptance or a rejection of the recommendation for the parking spot from the available parking spots.

14. A server for predicting an availability of a parking spot in a parking area, the server comprising:
one or more processors configured to:
receive real-time data associated with each of: one or more first users from one or more first sensors in one or more first user-computing devices, and one or more first vehicles from one or more second sensors in the one or more first vehicles, wherein the one or more first users are associated with one or more first vehicles;
process the real-time data associated with each of the one or more first users and the one or more first vehicles;
determine a likelihood of the availability of one or more parking spots based on at least the processed real-time data; and
recommend at least one available parking spot of the one or more parking spots to a second user of a second vehicle based on at least the determined likelihood, and a predefined constraint, wherein the predefined constraint is utilized to avoid traffic congestion along one or more parking lanes of the parking area, and wherein the predefined constraint comprises one or both of a size of the second vehicle or a number of vehicles waiting for said at least one available parking spot.

15. The server of claim 14, wherein the one or more processors are configured to receive a request from the second user of the second vehicle, wherein the request is indicative of at least a requirement of said at least one available parking spot in the parking area.

16. The server of claim 14, wherein the one or more processors are further configured to receive the real-time data associated with each of the one or more first users and the one or more first vehicles from one or more third sensors that are installed at one or more locations in a premise and the parking area associated with the premise.

17. A computer program product for use with a computer, the computer program product comprising a non-transitory computer readable medium, wherein the non-transitory computer readable medium stores a computer program code for predicting an availability of a parking spot in a parking area, wherein the computer program code is executable by one or more processors to:

generate a first signature for each of one or more first users associated with one or more first vehicles, parked at one or more parking spots in the parking area, based on at least a first set of data received from at least one or more first sensors in a first user-computing device associated with each of the one or more first users;

generate a second signature for each of the one or more first vehicles, based on at least a second set of data received from one or more second sensors in a first vehicle-computing device associated with each of the one or more first vehicles;

determine a likelihood of the availability of the one or more parking spots based on at least the first signature and the second signature;

receive a first input from a second user-computing device associated with a second user of a second vehicle, wherein the first input is indicative of a requirement of one of the one or more parking spots in the parking area;

present a user interface on a display screen of the second vehicle, the display screen displaying available parking spots of the one or more parking spots to the second user based on at least the determined likelihood; and recommend one of the available parking spots based on a predefined constraint, wherein the predefined constraint is utilized to avoid traffic congestion along one or more parking lanes of the parking area, and wherein the predefined constraint comprises one or both of a size of the second vehicle or a number of vehicles waiting for said one of the available parking spots.

* * * * *